April 30, 1963 R. MARTIN 3,087,882
FUEL ARRANGEMENTS FOR USE IN NUCLEAR
REACTORS HAVING VERTICAL CHANNELS
Filed March 5, 1958 2 Sheets-Sheet 2
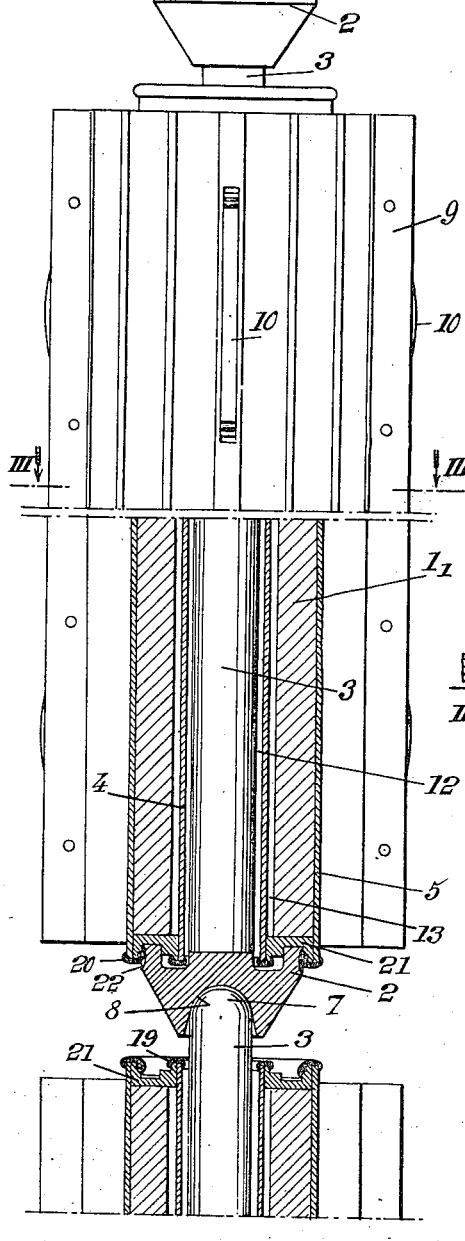
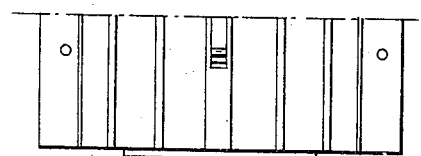
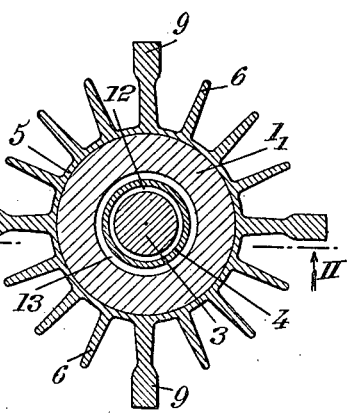

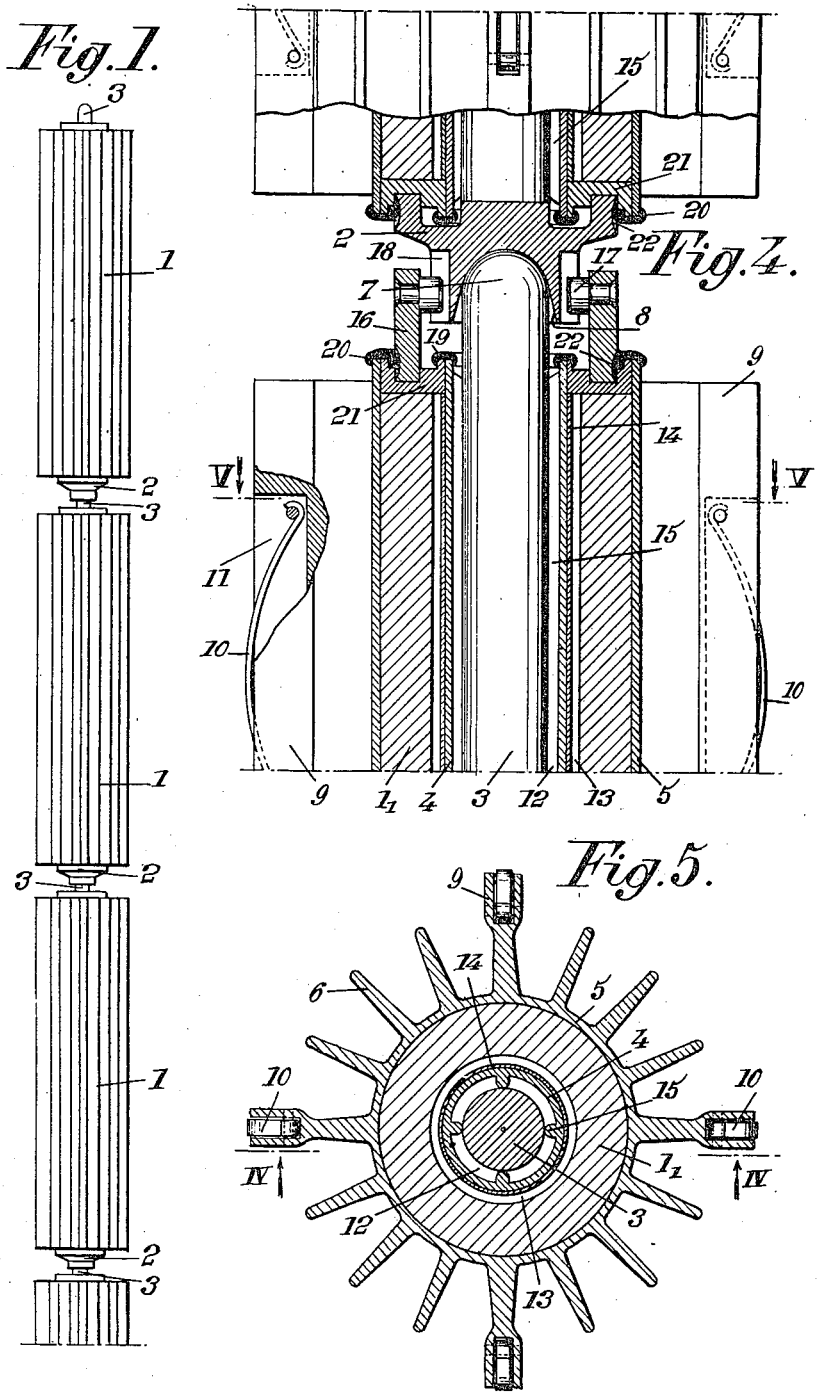

3,087,882
FUEL ARRANGEMENTS FOR USE IN NUCLEAR REACTORS HAVING VERTICAL CHANNELS
Roger Martin, Paris, France, assignor to Commissariat a l'Energie Atomique, Paris, France, a state administration
Filed Mar. 5, 1958, Ser. No. 719,304
Claims priority, application France Mar. 8, 1957
3 Claims. (Cl. 204—193.2)

The present invention relates to fuel arrangements for use in nuclear reactors having vertical channels and its main object is to make it possible to superimpose a greater number of fuel slugs.

According to this arrangement, a multiplicity of elements are vertically superimposed on one another in every vertical channel of the reactor, so that each of said elements supports those located above it and is supported by those located under it, said elements being made of a material having a high resistance to compression and a low neutron absorption coefficient and at least some of said elements are arranged to support fuel slugs so that each of said slugs is connected exclusively with the element that supports it.

According to a preferred embodiment of this invention, the above mentioned elements are of two kinds, to wit vertically elongated elements such as rods which do not support fuel slugs and between which the other elements are interposed, these second mentioned elements extending laterally, i.e. horizontally, to form brackets on which the cans of the fuel slugs are resting. Said cans advantageously have the form of cylindrical casings of annular circular section, each of them coaxially surrounding the rod that is supported by the bracket on which said can is resting.

Preferred embodiments of the present invention will be hereinafter described with reference to the accompanying drawings, given merely by way of example and in which:

FIG. 1 is an elevational view of a column of fuel cans containing the fissionable fuel, said column being made according to an embodiment of the present invention.

FIG. 2 is a corresponding elevational view, with parts in section on the line II—II of FIG. 3.

FIG. 3 is a horizontal sectional view on the line III—III of FIG. 2.

FIG. 4 is a vertical sectional view, on the line IV—IV of FIG. 5, of another embodiment of the fuel arrangement according to this invention.

FIG. 5 is a horizontal sectional view on the line V—V of FIG. 4.

It has been found that, in nuclear reactors making use of a solid moderator and cooled by means of a compressed gas, the vertical arrangement of the fuel slugs has proved advantageous.

The chief difficulty encountered in the construction of such reactors is due to the fact that fuel slugs to be placed in vertical channels have such bad mechanical properties at high temperatures that they behave in an unsatisfactory manner when a great number of such slugs are superimposed on one another so that the lowest ones have to support the weight of the whole.

To obviate this difficulty, according to the present invention, the fuel slugs located in a vertical column of the nuclear reactor are supported by at least some of the elements of a column of elements constituted by a multiplicity of such elements superimposed on one another, so that each of them supports those located above it and is supported by those located under it, said elements being made of a material having a high resistance to compression and a low neutron absorption coefficient, each of the slugs being connected exclusively with the element that supports it.

In the embodiment illustrated by the drawings, the above mentioned elements are of two kinds, to wit vertically elongated rods 3, made for instance of a material such as graphite or beryllia, which has a high resistance to compression even at high temperatures and a low neutron absorption coefficient, the other elements being in the form of supporting brackets 2 each interposed between two of said rods 3 and on the periphery of which are supported the fuel cans. Said brackets 2 are made of a material, such as zirconium, having also a low neutron absorption coefficient and a good resistance to bending or shearing stresses, even at high temperatures.

Each fuel can 1 (FIGS. 2 and 3) contains a tubular piece $1_1$ of a fissionable material, having a height of some decimeters and the can proper includes a cylindrical inner wall 4 and a cylindrical outer wall 5 of a metal or alloy such as aluminium or magnesium. This metal may have relatively bad mechanical properties at high temperatures.

Cooling of the fissionable material, or fuel, which consists for instance of uranium and which is heated as a result of fission, is essentially ensured by the external wall 5 of the can which is provided with cooling fins 6.

The brackets 2 on which the fuel cans are resting are in the form of circular elements made of a metal or alloy such as zirconium, sintered aluminium, or again of a ceramic material such as sintered alumina. In a general manner, this material must have a low neutron absorption coefficient and a good resistance to bending and shearing stresses at high temperatures.

Each of said brackets rests upon the top of a cylindrical rod 3 (made of graphite or beryllia for instance, as above stated) and preferably, as shown by the drawings, the top end 7 of such a rod 3 is in the form of one half of a sphere having the same diameter as rod 3 and having its center on the axis of said rod, said semi-spherical top end of the rod fitting in a housing 8 of the bracket 2, said housing being of hemispherical shape to fit on said rod and the edges of said housing being of flaring shape.

The correct positioning of each fuel can in the vertical channel of the reactor (which channel may be metallic or formed in the moderator itself) is obtained by means of radial fins 9 the ends of which are advantageously provided with antivibration springs 10 (FIGS. 2, 4 and 5) made of zirconium or an alloy of aluminium and magnesium for instance.

These springs may be located on the outer edges of fins 9 but advantageously, as shown by FIG. 4, they are mounted in housings provided in the edges of said fins.

The cooling fins 6 are mounted between the centering fins 9.

It may be advantageous to cool down the inner wall formed on the fuel can in order to avoid deterioration thereof. It will then be preferable, due to the small annular space 12 existing between rod 3 and the inner wall 4 of the fuel can, to provide a thermal insulation between the fuel (uranium) contained in the can and said inner wall 4. This result may be obtained by providing between these last mentioned elements, either a material such as magnesia in the form of a powder, or an annular sheet or gas or of a vacuum 13.

Introduction and removal of the fuel cans take place either at the top or at the bottom of the column. But anyway the column of fuel cans is held or pushed by a part acting on the bracket of the lowest fuel can of the column.

In the modification illustrated by FIGS. 4 and 5, the inner wall 4 of each fuel can is reinforced by the provision of a tubular jacket 14 made of a zirconium alloy, such an arrangement being particularly advisable when a vacuum is provided in the annular space 13 between the inner wall 4 of the fuel can and the fuel contained in said can.

Longitudinal ribs 15 provided on the inner wall 4 may also contribute in stiffening the can and guiding it with respect to the corresponding rod 3.

Means may be provided for the angular positioning of the fuel cans with respect to one another, such means being for instance constituted, as shown by FIGS. 4 and 5, by a zirconium ring 16 fixed on the top of every fuel can and provided with radial projections 17 adapted to engage radial notches 18 of the next bracket 2 and to slide freely in said notches in the axial direction.

The end walls $1_1$ of the fuel cans are fixed to the inner and outer walls 4 and 5 by welds 19 and 20. One of these welds may also serve to fix on the lower can walls 21 the brackets 2 (FIGS. 2 and 4), whereas another of said welds serves to fix to the upper can walls 21 the above mentioned rings 16 (FIG. 4). Grooves 12, 22 are, for this purpose, provided in said parts 2 and 16.

The rods 3, when they are made of graphite, may be obtained by extrusion followed by machining on a lathe. When said rods are made of beryllia, they may be obtained by sintering without any other operation.

The brackets 2 may be obtained by sintering (sintered aluminium or sintered alumina), shaping (zirconium or alloys), casting, etc., the rough pieces thus obtained being possibly machined to be given the desired final shape.

The advantages of the fuel arrangements above described are numerous and the following ones may be cited as particularly important:

Every fuel can supports only its own weight, whatever be its position along the column;

Each bracket, such as 2, is subjected to shearing and bending stresses only by the weight of a single can;

The vertical rods 3 may have an expansion different from that of the cans without transmitting any stress to said cans;

The combination of the centering springs and of the swivel arrangement constitutes a system which opposes vibrations due to the displacement of the fuel cans in the channels of the reactor;

The tubular shape of the fuel cans increases the area of thermal exchange as compared with a mere cylindrical fuel can of the same cross-section;

Separation of fuel cans having undergone some deteriorations is very easy since the cans merely bear upon the brackets which are themselves only superimposed on the rods;

The materials that are used are ordinary materials available on the market and their machining involves no particular difficulty.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A fuel arrangement for a nuclear reactor having vertical channels which comprises, in combination, a plurality of structures superimposed in each of said channels so that each of said structures supports those located above it and is supported by those located under it, each of said structures including a vertical rod and a bracket mounted at one end of said rod, said rods being made of a material having a low neutron absorption coefficient and a high resistance to compression and being selected from the group consisting of graphite and beryllia, said brackets being made of a material having a low neutron absorption coefficient and a high resistance to bending and shearing and being selected from the group consisting of zirconium, sintered aluminum, and sintered alumina, the top end of each of said rods and the bottom of the corresponding bracket constituting the cooperating elements of a swivel joint, and fuel cans in said channels resting endwise on said brackets, the top end of each of said fuel cans being spaced from the bracket located immediately above it so that no load is transmitted from said brackets to said fuel cans.

2. A fuel arrangement for a nuclear reactor having a core provided with a plurality of vertical channels, which comprises, in combination, a plurality of elements vertically superimposed in each of said channels to form a column therein, each of said elements supporting those located above it and being supported by those located under it, said elements being made of a material having a low neutron absorption coefficient and a high resistance to compression selected from the group consisting of graphite and beryllia, a plurality of brackets being each interposed between two of said elements and projecting laterally with respect thereto, said brackets being made of a material having a low neutron absorption coefficient and a high resistance to bending and shearing selected from the group consisting of zirconium, sintered aluminum and sintered alumina, the top end of each of said rods and the bottom of the corresponding bracket constituting the cooperating elements of a swivel joint, and fuel cans in said channels resting endwise on the portions of said brackets that project laterally, the top end of each of said fuel cans being spaced from the bracket located immediately above it.

3. A fuel arrangement for a nuclear reactor having a core provided with a plurality of vertical channels, comprising in combination, a plurality of cylindrical rods vertically superimposed in each of said channels to form a column therein, each of said rods supporting those located above it and being supported by those located under it, said rods being made of a material having a low neutron absorption coefficient and a high resistance to compression and being selected from the group consisting of graphite and beryllia, a plurality of circular brackets each interposed between two vertically adjoining rods and surrounding the lower end of the upper rod, said brackets being made of a material having a low neutron absorption coefficient and a high resistance to bending and shearing and being selected from the group consisting of zirconium, sintered aluminum and sintered alumina, the top end of each of said rods and the bottom of the corresponding bracket constituting the cooperating elements of a swivel joint, and tubular fuel cans in said channels, said fuel cans being in the form of cylindrical casings of annular circular section, each of said cans resting on one of said brackets respectively and coaxially surrounding the rod that is supported by said last mentioned bracket, the top end of each of said fuel cans being spaced from the bracket located immediately above it.

References Cited in the file of this patent

UNITED STATES PATENTS

| | | |
|---|---|---|
| 2,798,848 | Kingdon | July 9, 1957 |
| 2,824,056 | Leverett | Feb. 18, 1958 |
| 2,852,456 | Wade | Sept. 16, 1958 |
| 2,852,460 | Abbott et al. | Sept. 16, 1958 |
| 2,853,446 | Abbott et al. | Sept. 23, 1958 |
| 2,863,815 | Moore et al. | Dec. 9, 1958 |
| 2,877,170 | Greenhalgh et al. | Mar. 10, 1959 |

FOREIGN PATENTS

| | | |
|---|---|---|
| 754,183 | Great Britain | Aug. 1, 1956 |

OTHER REFERENCES

Glasstone: "Principles of Nuclear Reactor Engineering" (1956), Van Nostrand, pp. 495–516.

Reactor Handbook, vol. 3, "Materials," pp. 15, 19, 44, 45, 75, 141, 142 (AECD–3647).

Barnes: "Proceedings of the International Conference on the Peaceful Uses of Atomic Energy," vol. 3, p. 331 (1955).